(12) United States Patent
Balas

(10) Patent No.: US 12,025,498 B2
(45) Date of Patent: Jul. 2, 2024

(54) TRACE MICROANALYSIS MICROSCOPE SYSTEMS AND METHODS

(71) Applicant: SPECTRICON IKE, Chania (GR)

(72) Inventor: Konstantinos Balas, Chania (GR)

(73) Assignee: SPECTRICON IKE, Chania (GR)

( * ) Notice: Subject to any disclaimer, the term of this patent is extended or adjusted under 35 U.S.C. 154(b) by 295 days.

(21) Appl. No.: 17/778,094

(22) PCT Filed: Nov. 20, 2020

(86) PCT No.: PCT/EP2020/082878
§ 371 (c)(1),
(2) Date: May 19, 2022

(87) PCT Pub. No.: WO2021/099568
PCT Pub. Date: May 27, 2021

(65) Prior Publication Data
US 2022/0412802 A1    Dec. 29, 2022

Related U.S. Application Data

(60) Provisional application No. 62/938,270, filed on Nov. 20, 2019.

(51) Int. Cl.
*G01J 3/28* (2006.01)
*G01J 3/02* (2006.01)
(Continued)

(52) U.S. Cl.
CPC ............. *G01J 3/2823* (2013.01); *G01J 3/021* (2013.01); *G01J 3/0224* (2013.01);
(Continued)

(58) Field of Classification Search
CPC ....... G01J 2003/1213; G01J 2003/1226; G01J 2003/1247; G01J 2003/2806; G01J 3/021;
(Continued)

(56) References Cited

U.S. PATENT DOCUMENTS 6,529,271 B1    3/2003  Engelhardt
2005/0105791 A1 5/2005  Lee et al.
(Continued)

FOREIGN PATENT DOCUMENTS

EP         1672354 A1    6/2006
WO    WO 2006/051319 A1  5/2006

*Primary Examiner* — Hina F Ayub
(74) *Attorney, Agent, or Firm* — DP IP GROUP; Franco S. De Liguori

(57) ABSTRACT

The invention discloses a Trace Microanalysis Microscope System for high throughput screening. A multimodal imaging sensor arrangement acquires color, multispectral, hyperspectral and multi-directional polarized imaging, independently and in combinations thereof. In one aspect of this disclosure, the multimodal acquisition is combined with a plurality of sample illumination modes, further expanding the dimensionality of the generated data. In another aspect of this invention, machine learning-based methods combining and comparing a-priori data with the acquired multimodal data space, provide unique identifiers for the composition of the analyzed target objects. In yet another aspect of this invention, projection mapping of the identified compositional features navigates secondary sampling for subsequent analyses.

15 Claims, 9 Drawing Sheets

(51) Int. Cl.
*G01J 3/12* (2006.01)
*G01J 4/04* (2006.01)
*G01N 21/17* (2006.01)
*G01N 21/21* (2006.01)
*G01N 21/23* (2006.01)
*G01N 21/31* (2006.01)

(52) U.S. Cl.
CPC ............... *G01J 3/2803* (2013.01); *G01J 4/04* (2013.01); *G01N 21/21* (2013.01); *G01N 21/23* (2013.01); *G01N 21/31* (2013.01); *G01J 2003/1213* (2013.01); *G01J 2003/1226* (2013.01); *G01J 2003/1247* (2013.01); *G01J 2003/2806* (2013.01); *G01N 2021/1765* (2013.01); *G01N 2021/216* (2013.01)

(58) Field of Classification Search
CPC ...... G01J 3/0224; G01J 3/1256; G01J 3/2803; G01J 3/2823; G01J 3/32; G01J 3/36; G01J 4/04; G01N 2021/1765; G01N 2021/216; G01N 21/21; G01N 21/23; G01N 21/278; G01N 21/31; G01N 21/6458
See application file for complete search history.

(56) References Cited

U.S. PATENT DOCUMENTS

| | | | |
|---|---|---|---|
| 2006/0133643 A1* | 6/2006 | Bennett | G01N 21/6486 382/284 |
| 2019/0041319 A1 | 2/2019 | Ruers et al. | |
| 2022/0066189 A1* | 3/2022 | Yakovlev | G01J 3/2823 |

* cited by examiner

TRACE MICROANALYSIS MICROSCOPE SYSTEMS AND METHODS

RELATED APPLICATIONS

This application is a national stage application under 35 U.S.C. 371 of PCT/EP2020/082878, filed Nov. 20, 2020, which claims the benefit of U.S. Provisional Patent Application No. 62/938,270, filed on Nov. 20, 2019.

BACKGROUND

Field

The present disclosure relates to microanalysis systems and related methods. In particular, but not exclusively, the present application discloses a trace microanalysis microscope (TMM), a trace microanalysis system equipped with the TMM, and related methods for performing automated multimodal imaging analysis and identification of traces, such as those found in crime fields.

BACKGROUND INFORMATION

Crime investigation involves technologies for trace collection from the crime field (fibers, skin cells, glass material, blood, sperm etc.) and subsequent analysis of the collected traces in specialized labs. Traces, often called target objects, are collected from the crime field using a variety of lifting materials such as Trace Lifting Tapes (TLTs). One side of the TLTs is covered with adhesive material, so that when it comes in contact with traces and microscopic target objects found in the crime field, it collects them for subsequent analysis as they may be related with the crime. The trace collecting surface of the TLTs is covered with a flexible polymer film for protecting the collected target objects from contamination, hereafter referred as Backing Film (BF). A BF-TLT member adhered together and encapsulating the collected target objects will be hereafter referred to as a Traces Samples (TS). When a field investigation process is completed, the TSs are transferred to specialized labs for microscopic, chemical and biological analyses. Microscopy is often the first line examination of the TSs involving visual morphological analysis, comparison with reference samples, birefringence analysis etc. More advanced instruments integrate spectroscopy modules, utilized for obtaining chemical composition information. TSs may contain target objects that remain unidentifiable after all these analyses and, if this is the case, they are removed from the TS and are submitted for more advanced destructive analysis.

Generating a large number of TSs from a single crime field is a typical practice, with their total surface reaching, sometimes, the size of one square meter or more. One major problem related with this process is that it is extremely time consuming and labor intensive. Full size, point-by-point examination of these large TSs areas at the micron or even submicron level and utilizing several analytical and imaging modalities is not possible within the tight time frames set by crime investigation practices. To further elaborate on this, we may assume that fields-of-view of 10 µm are examined with a microscope operating at a proper magnification. This means that $10^{11}$ fields need to be examined to fully scan 1 m²TSs area that may be collected from a single crime field. If we (reasonably) assume that the examination time of every field lasts 15 min, then total examination time of an 1 m² TS may reach the colossal time of 2.500 years. This example shows that the full, field-by-field examination of typically sized TSs is completely unrealistic. For this reason, arbitrary selected point areas are analyzed with the risk of missing critical information.

A second problem related with this process is that trace identification and selection of areas of interest onto the TSs for subsequent analyses is based solely on the subjective human inspection. Based on visual impressions, selected areas are marked with a pen, which are subsequently cut with scissors or guillotines and are submitted for subsequent analyses. It is obvious that the method is reading and sampling error prone that may result in erroneous conclusions.

A third problem relates to the complexity and the diversity of the analytical methods to which the removed TSs are subjected. The techniques involve a series of destructive and nondestructive spectroscopic methods, DNA analysis, optical microscopy etc. These known procedures are time consuming (time is critical in crime investigation), labor intensive and require a long list of very expensive analytical techniques. Notably, the correlation and the direct comparison of the results of these techniques are critical in trace identification, however, it comprises today a challenging task.

Yet a fourth problem with these known procedures is the requirement for highly trained scientific and technical personnel to perform the selection of the proper TSs eligible for subsequent submission to crime investigation labs. It is well known that such highly trained personnel is only available at centralized labs and it is missing in remote locations.

State of the art high throughput or high content screening microscopy arrangements may, in principle, offer solutions to this problem, however state-of-the-art devices have been designed to analyze a large number of small sized microscopy slides or cuvettes, rather than large TSs. Industry standard high throughput devices serve their purpose by utilizing electromechanically-driven sample uploading arrangements. These mechanisms are employed for automatically interchanging samples in front of a stationary microscope objective, facilitating their imaging and analysis without human intervention. It is obvious however that this type of arrangements cannot be applicable for analyzing large TSs because the footprint of such an uploading mechanism will be unacceptably large.

SUMMARY

One limitation of prior art high throughout/content screening is that they neither incorporate arrangements and methods for automatically identifying the chemical and the structural characteristics of target objects nor navigation tools for localizing them for secondary sampling and analysis.

The present invention aims to provide a trace microanalysis microscope (TMM), a trace microanalysis system (TMS) equipped with the TMM, and related methods, mitigating the limitations present in prior art microanalysis microscopes, high throughput, high content screening systems and methods.

According to one aspect of the present invention the disclosed microanalysis method comprises the steps of: collecting traces from a crime field with a trace collection method including, but not limited to Trace Lifting Tapes (TLT); disposing the collected objects onto backing means such as a glass slides, a glass panel or film cumulatively called a Backing Film (BF), to form the so called Traces Sample (TS); Disposing and fixing said TS over a Transparent Glass Window (TGW), which is a member of a supporting structure that mounts also an XYZ translator of a Multimodal Imaging Head (MIH), an overview camera and a light projector; Scanning of said TS with said MIH, disposed over said XYZ translator and switching operation in every translation step between imaging modes selected from a group comprising preferably hyperspectral, multispectral, color and polarization imaging modes and combinations thereof, combined with transmission, reflection, fluorescence and polarization TS illumination modes and combinations thereof; Analyzing automatically the acquired data set comprising a Multimodal Imaging Data (MID) set, consisting of optical parameters, morphological data, transmission, reflection, fluorescence spectra, polarization parameters, birefringence parameters and calculating Optical Parameter Maps (OPM), from said MID. In the exemplary embodiment, the method further comprises the step of comparing said acquired MID values with reference MID values, obtained from TS objects with known chemical and or structural characteristics, so as to establish a correlation formula between them, and, finally, to convert said OPM into TS Chemical/Structural Identity Maps (CSIM).

In the exemplary embodiment, the method further comprises the step of projecting light marks onto said TS disposed onto said TGW, with the shape and color patterns of said marks being informative for identity of the marked objects, with said identity being derived from said OPM or from said CSIM. Said light marks may be utilized for guiding the delineation of highlighted areas over said TS, with an ink pen or a similar tool, for facilitating handling said TS after the completion of their analyses. Handling may include cutting of delineated areas to be submitted for subsequent analysis, such as PCR analysis gas chromatography analysis etc.

According to another aspect of the present invention, the disclosed TMM according to an exemplary embodiment further comprises a MIH capable of acquiring color, multispectral, hyperspectral and polarization imaging data through a single objective lens.

According to another aspect of the present invention, the disclosed TMS according to an exemplary embodiment further comprises coherent and non-coherent light source modules (LSM), for illuminating said TS at a variety of directions. Such directions may include 180°, 0°, 45° or other oblique directions with respect to the imaging axis, to implement transmission) (180° and epi-illumination (0°, 45°, oblique) imaging and spectroscopy modes. Epi-illumination geometry enable reflection, fluorescence and polarization modes.

According to another aspect of the present invention, the disclosed TMS according to an exemplary embodiment further comprises polarization optics interposed in the imaging ray path of MIH for acquiring polarized images at one selectable plan or at fixed multiple polarization plans simultaneously.

According to another aspect of the present invention, the disclosed TMS according to an exemplary embodiment further comprises polarization filtering of said LSM so that their emitted light has a plan, circular and/or elliptical polarization.

According to another aspect of the present invention, the disclosed TMS according to an exemplary embodiment further comprises an electronically driven birefringence compensator for measuring retardance and/or birefringence parameters of said TS.

According to another aspect of the present invention, the disclosed TMS according to an exemplary embodiment further comprises a light projection system (LPS) to project light marks, securely mounted on an arm permanently affixed over said structural platform and at a proper distance and LPS lens characteristics so that said light marks can reach every point of said structural platform supporting the examined TS, informing for topology of the objects encapsulated in said TS.

According to another aspect of the present invention, the disclosed TMS according to an exemplary embodiment further comprises an Overview Camera (OVC). Said OVC is securely mounted on an arm permanently affixed over said structural platform and at a proper distance and camera lens characteristics, so that the Field of View (FOV) of said OVC overlaps with the entire area of said structural platform used to support said TS. The image acquired by said OVC is displayed on a monitor, allowing for digitally annotating Regions of Interest (ROI) areas onto said TS. Selected ROIs may comprise, for example, said TS areas sufficiently populated with target objects, eligible for dense scanning by said MIH.

According to another aspect of the present invention, the disclosed TMS according to an exemplary embodiment further comprises an electronic control unit for: a) driving the XYZ translators of said MIH; b) controlling all multimodal camera operations, including image acquisition parameters (shutter, gain, calibration); c) switching on and off and dimming of said LSM and for synchronizing them with said MIH operations; d) controlling said LPS and said OVC.

According to another aspect of the present invention, the disclosed TMS according to an exemplary embodiment further comprises a computer processor unit (CPU) executing program instructions for the storing, retrieving, processing and analysis of said MID, including but not limited to unsupervised and supervised classification, machine learning and other artificial intelligence algorithms, for calculating said OPM and said CSM.

In the exemplary embodiment, the TMS is configd for implementing auto calibration procedures that are automatically executed at predetermined time intervals, including a first calibration procedure for compensating possible drifts in recorded image pixel values and spectral content and a second positioning calibration procedure. The first calibration procedure is implemented with the aid of calibration targets with known reflectance and fluorescence spectra, and the second positioning calibration procedure is implemented with the aid of micron size markings permanently graved onto a platform surface of the TMS.

According to another aspect of the present invention, the disclosed TMS according to an exemplary embodiment comprises a software module having a graphical user interface including an imaging mode acquisition menu and a submenu for defining a list of image acquisition parameters for the imaging modes supported, including spectral range and spectral resolution, camera shutter and gain settings, spatial resolution and calibration operations.

According to another aspect of the present invention said TLT and said BF are made from optically clear, non-birefringent and non-fluorescent material in a broad spectral band that includes the Ultraviolet, the visible and the Near Infrared Band. Such materials comprise one or more of (indicatively) Polymethyl methacrylate (PMMA), cycloolefin, cast vinyl and polycarbonate material. Selecting TLT and BF materials with the aforementioned optical properties allows for eliminating their interference with the measured optical parameters of said target objects.

According to another aspect of the present invention, the disclosed TMS according to an exemplary embodiment further comprises a slot in said structural platform for securely receiving said BF with said TLT adhered on it. The BF may have a tab that locks into said slot, and an electronic ID, which is read by the TMM when the BF is received by the slot.

BRIEF DESCRIPTION OF THE DRAWINGS

The following detailed description of the embodiments of the present disclosure will be better understood when read in conjunction with the accompanying drawings. For the purpose of illustrating the disclosure, there is shown in the drawings embodiments which are presently preferred. It should be understood, however, that the present disclosure is not limited to the precise arrangement and instrumentalities shown.

DETAILED DESCRIPTION

Figure 1:
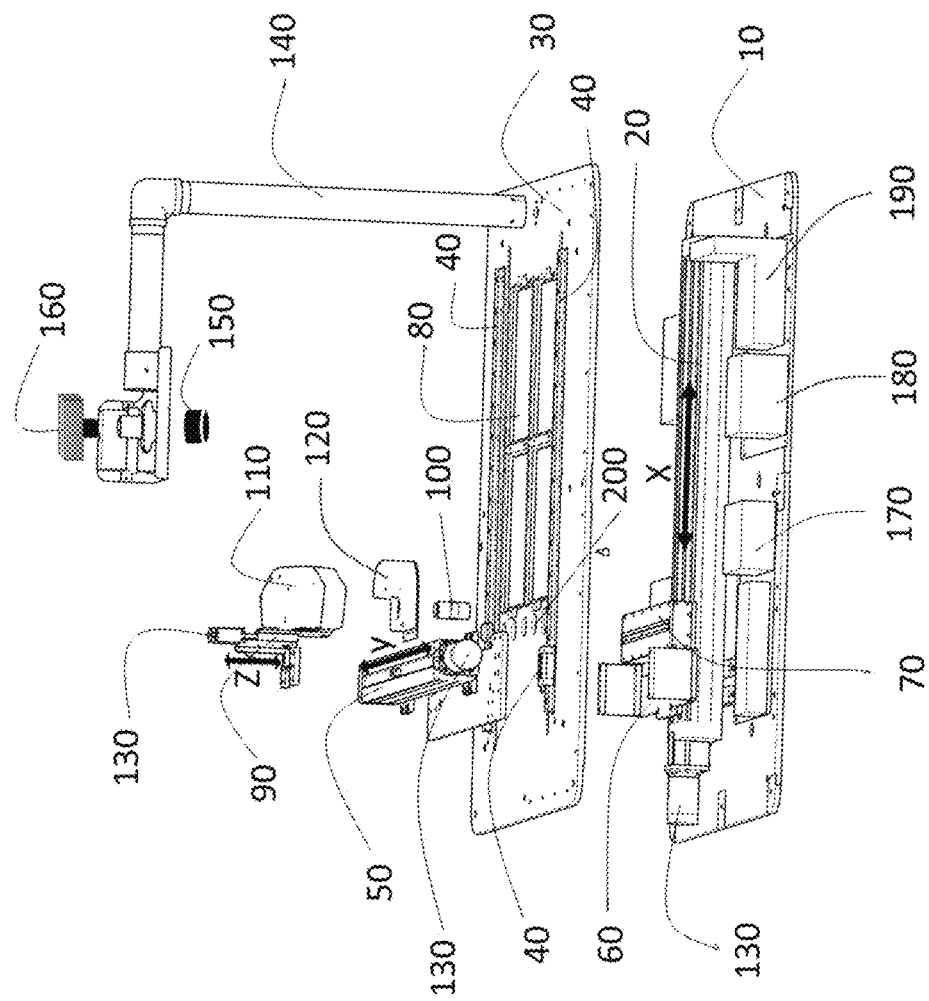
FIG. 1 illustrates the exploded layout of an exemplary configuration of the disclosed TMM comprising a stationary supporting structure an electronically driven spatial translation platform, a Multimodal Imaging Head a Light Source Module, a Computer Processing Unit and overview camera and a Light Projection System.

For purposes of explanation, specific configurations and details are set forth in order to provide a thorough understanding of the invention. However, it will also be apparent to one skilled in the art that the invention may be practiced without the specific details presented herein. Furthermore, well-known features may be omitted or simplified in order not to obscure the invention.

The word "exemplary" is used herein to mean "serving as an example, instance, or illustration". Any embodiment described herein as "exemplary" is not necessarily to be construed as preferred or advantageous over other embodiments.

Existing high throughput/high content screening systems, based on either movable stages or on sample uploading conveyors, suffer from the following limitations:

a) They are not made to deploy the total amount of samples over a large stationary supporting structure, with the direct consequence of not being able to offer simultaneous and random access to all target objects. As such, state-of-the-art solutions are not intended to offer projection of patterns allowing for the direct visualization of the nature and population of the target objects, over the spatial areas that they are physically confined.

b) Existing high throughput content/screening microscopes refrain from offering automated identification of target traces, restricting their use mainly in recognizing fluorescence emissions from fluorophores with known emissions tagging biological substances. Such systems are not intended to provide chemical and structural identification of unknown target objects and for this reason they integrate rather simple sensors and modalities, not allowing for the direct, point-by-point cross-correlation of the data they acquire.

The present disclosure overcomes the foregoing disadvantages in the prior art by providing a TMM, a TMS equipped with the TMM, and related methods integrating, overall advancing, objectifying and automating trace collection and analysis procedures.

The TMM, the TMS equipped with the TMM, and related methods described with respect to the embodiments of the present invention provide an integrated high throughput/high content screening method and arrangement capable of:
a) collecting micron-millimeter scale sized traces/objects from a natural field, which are subsequently disposed over an at least A4 sized stationary flat stage/supporting structure;
b) automatically localizing and identifying the structural and/or the chemical identity of said target objects, though the processing and analysis of said MID, acquired with said LSM illuminating and said MIH performing multimodal imaging of target objects under analysis, with both said LSM and MIH being spatially translated over said TS, disposed over said stationary supporting structure; c) projecting light marks onto said target objects disposed onto said stationary supporting structure and with the pattern of said marks being defined by said OPM and CSIM and being informative for the location, the size and identity of said target objects.

FIG. 1 illustrates the exploded layout of an exemplary configuration of a TMM. Said stationary supporting structure comprises a two-level assembly. The first level 10 comprises an aluminum plate where the main X motorized linear guide 20 is mounted. The second level 30 is also made of an aluminum plate and supports two parallel sliders guide 40 for the motion of the Y translator 50 along the X direction. The Y scanner's X motion is guided by the X translator, through a U-shaped mount 60 crossing the second level through dedicated slots, also offering means for cable management. The U-shaped mount is also used for supporting the half-tube illumination dome, used for the (trans-) illumination of the sample hereafter named as trans-LSM 70.

In an exemplary configuration of said TMS, the second level assembly 30 has four A4 sized slots covered by transparent glass windows (TGWs) 80 for supporting an equal number of A4 sized TSs. The A4 size equals to 297×210 mm and it is considered as a convenient size, because folders drawers and in general storage/handling means for this paper size are widely available. A four A4 surface area (about 600×400 mm) is a typical total TS area collected from a crime field. Said TGWs 80 are preferably made from optically clear non-fluorescing and non-birefringent materials in a wide spectral band ranging from UV to IR.

The Z translator 90 is mounted over the trolley of the Y translator. Coupled with imaging optics means 100, said MIH 110 is mounted over the Z translator's trolley, together with the epi-illumination sub-unit of said LSM, hereafter named as epi-LSM 120. Said imaging optics means 100 may be microscope objectives, zoom optics or combinations thereof. The motion of the Z-axis trolley is dedicated to controlling the focusing of both said MIH 110 and epi-LSM 120 to the same Z-axis point.

The motion of the three trolleys is caused by three stepper motors 130. The rotational motion of said stepper motors is converted to linear translation with the aid, for example, of worm gears or equivalent mechanical arrangements. Said trans-LSM 70 is aligned with said imaging optics means 100 are moved together along the X-axis 20. For a given X-position, the longish trans-LSM 70 remains stationary and switched on, for the time period required for said imaging optics means 100 (coupled with said MIH 110) to scan the entire Y direction of said TS at the given X location. When required, the Z-translator 90 moves until sharp focusing is achieved. This process is repeated in the next translation step of the X-translator 20 and for a plurality of scanning steps.

An inverted L-shaped pole 140 is mounted over the second level platform 30 of the TMM's supporting structure. The second end of said pole is coupled with a basis supporting said LPS 150 and said OVC 160, arranged so that their central ray axes to be substantially co-linear. This is for ensuring that their FOV substantially overlaps with the total four A4 TGW area of said supporting structure.

The two levels of said supporting structure may be held together with antivibration poles, and the free-space between them may comprise the housing of the power supply 170, the control electronics 180 and the control and processing unit (CPU) 190. Said control electronics 180 drive all subunits of the TMM, including the stepper motors and said CPU 190 controls all the data acquisition parameters and operations. Said CPU 190 is equipped with connectors for enabling the TMM's interfacing with a variety of peripherals including display means, keyboard, mouse and touch screen means.

Near the rest position (X=0, Y=0) of the X-translator 20 and the Y-translator 50, a number of slots have been engraved over said second level platform 30 to host calibration samples 200. Calibration samples may include $Ba_2SO_4$ tablets with unity reflectance for calibrating the reflection imaging mode, flat optical diffuser windows for calibrating the transmission mode and stable multicolour fluorescence targets for calibrating the fluorescence imaging mode. Said calibration targets may also include standardised scales with micron level lines for calibrating the motion of said translators.

All members of the TMM's system lying above the second level platform may be covered with a pivoting enclosure system (not shown) for system and user protection. The TMM can start the scanning process only when the pivoting cover is firmly closed. Accordingly, opening of the pivoting enclosure system will trigger the termination of the TMM operation. This automation is achieved through a contact switch.

Figure 2:
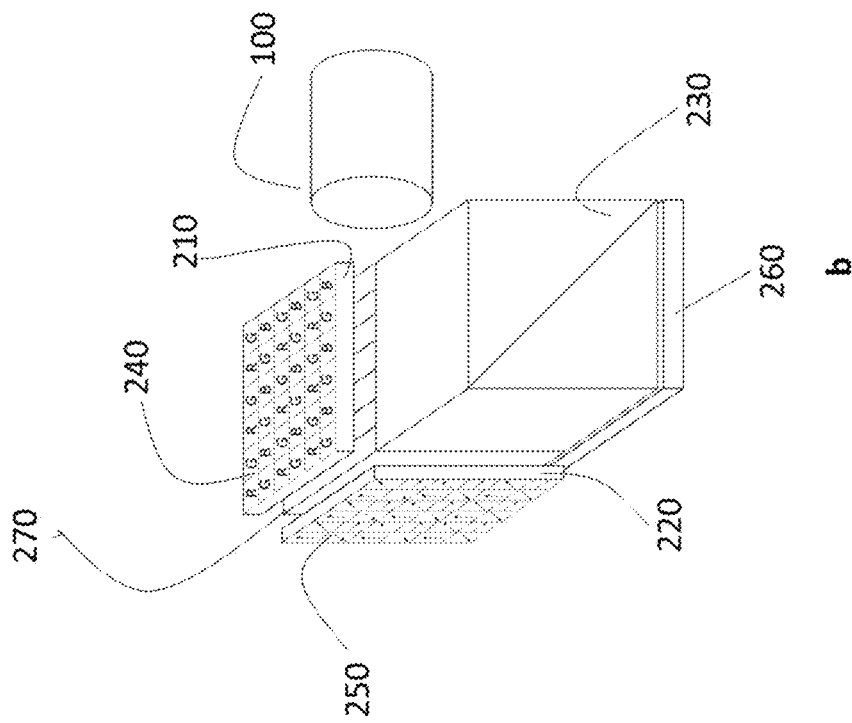
FIG. 2 illustrates a multimodal imaging head arrangement comprising one color and one black and white-polarization imaging sensor and translator means moved by an actuator onto which a beam divider and an electronically driven tunable filter are disposed. The beam divider and an electronically driven tunable filter are disposed and selectively interposed in an imaging ray path of said imaging sensor arrangement, as depicted in FIG. 2a and FIG. 2b positioning states, so that said MIH is operable in color, snapshot multispectral, hyperspectral imaging and polarization imaging modes and combinations thereof.
Figure 2:
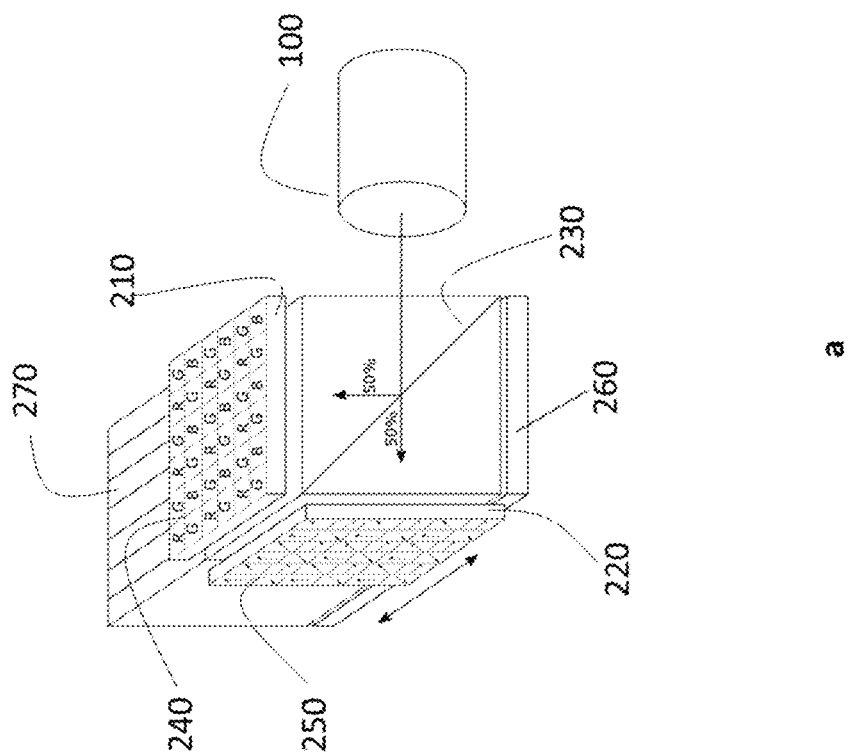

Reference now is made to FIG. 2, which illustrates a schematic of the disclosed sensor arrangement of said MIH 110. Multimodal operation is essential for enhancing the analytical power of an analytical instrument providing non-destructive analysis. A multimodal sensor arrangement acquires a multidimensional data stream, that may be expressed as a space of parameters, defining the physicochemical properties of said target objects. This space offers a global characterization of said target object, which is synonymous to a unique identity that may be used to label said target objects with their physicochemical substance. For example, the acquisition from the same target object of transmission, reflection, fluorescence and polarization data as a function of the wavelength, generates a long list of characteristics and independent parameters. These parameters are independent with each other because they are related with the different physics of the light-matter interaction phenomena involved. If, for example, two target object materials, e.g. fibers, have the same pattern in color imaging and even the same pattern in fluorescence color imaging, there are many chances to have different patterns in their infrared spectra and/or their polarization pattern. The foundation of the present disclosure is that in a Multimodal Imaging Data (MID) space, one can find unique identifiers for a long list of target objects.

Another important aspect of this disclosure is the necessity of acquiring the aforementioned MID-space with a single sensor arrangement and though a single imaging optics aperture, so that the images obtained from all the supported imaging modes are spatially co-registered. This way, said MID space can be calculated for every image pixel, which is an essential prerequisite for achieving mapping of said physicochemical identities of a number of different target objects, present in said TS. The present disclosure addresses the unmet need for a multimodal, common aperture MIH. The sensor arrangement of said MIH comprises a dual sensor arrangement, one color 210 and one Black and White (B&W) 220 imaging sensor. The sensors form an orthogonal shape to allow for the simultaneously capturing of the images formed by said optical imaging means and split by a beam divider 230. The RGB letters symbolize the mosaic arrangement of the Red (R), Green (G) and Blue (B) primary color filters 240, each one disposed over a single pixel's area of a color sensor. The arrows drawn over the surface of the B&W sensor symbolize polarizing filters 250, each one disposed over a single pixel's area. These filters are oriented to 0°, 45°, 90° and 135° over blocks of 4×4 pixels. Polarized sensors are commercially available such as for example the IMX250MZR by Sony. Imaging with a polarized sensor may have a dual mode operation, namely: a) a polarized operation imaging mode where four images, each one corresponding to one of the aforementioned polarization angles, are displayed in real time; and b) a non-polarized imaging mode, which results from the averaging of the polarized image intensities of every 4×4 pixel block, with the averaged intensities forming a regular, polarization-independent B&W image. Polarized operation offers a means for assessing a variety of phenomena related to the material's crystalline structure and to its perturbations. Depending on the structural organization of materials, polarized light interacting with them, either in the transmission or in the reflection mode, may change its polarization state. Moreover, non-polarized light may become polarized when interacting with certain materials. A convenient way to capture these material-specific changes of the polarization states is the capturing of the so-called Stokes parameters, which inform for the dominant polarization orientation. According to the present disclosure, the calculation of the Stokes parameters may use as input the pixel intensities of the B&W camera operating in the polarization mode. Stokes parameters comprise in our case the polarization coordinates of said MID-space. In one exemplary embodiment, the sensor arrangement of FIG. 2a comprising beam divider, color imaging sensor and polarized imaging sensor means, acquires Transmission (T), Reflection (R), Fluorescence (F), and Polarization Images (P). This is done by simply switching On and Off the corresponding light sources of said LSM. In another exemplary embodiment said beam divider is a dichroic mirror, reflecting the visible part of the spectrum to the color sensor and transmitting the infrared part of the spectrum to the B&W senor. This embodiment makes the real-time multispectral imaging possible in all the aforementioned imaging modes. In yet another exemplary embodiment, said beam divider in disposed over an electronically driven linear translator 260 together with tunable optical filter means 270. When the tunable filter means is interposed in the back focal space of said imaging optics means (FIG. 2b), the color sensor is blind and said B&W sensor captures hyperspectral data in four polarization directions. Several other embodiments are also possible such as for example combining color and polarization imaging in the same sensor and dedicating a B&W sensor to hyperspectral imaging. Said tunable filter means is selected from a group comprising, Discrete Band-Pass Filters Arrays (DBPFAs), Variable Interference Filters (VIF), Liquide Crystal Tunable Filters (LCTF) and Acousto-Optic and Tunable Filters (AOTFs). The tunable filter is synchronized with the imaging sensor module, so that a stack of narrow band spectral images is captured in every tuning step, corresponding to the same object's area. From the collected image stack (spectral cube), a full spectrum is calculated for every image pixel. In some applications requiring extended ultraviolet (UV) sensitivity the B&W sensor is selected from the category of the UV enhanced, back-illuminated with quartz window. The tunable filter's transmission characteristics can also be selected to match the sensitivity spectral range of said B&W sensor. With this exemplary embodiment, the disclosed MIH acquires hyperspectral imaging data in all T, R, F, and P modes, comprising the spectral coordinates of said MID-space.

Figure 3:
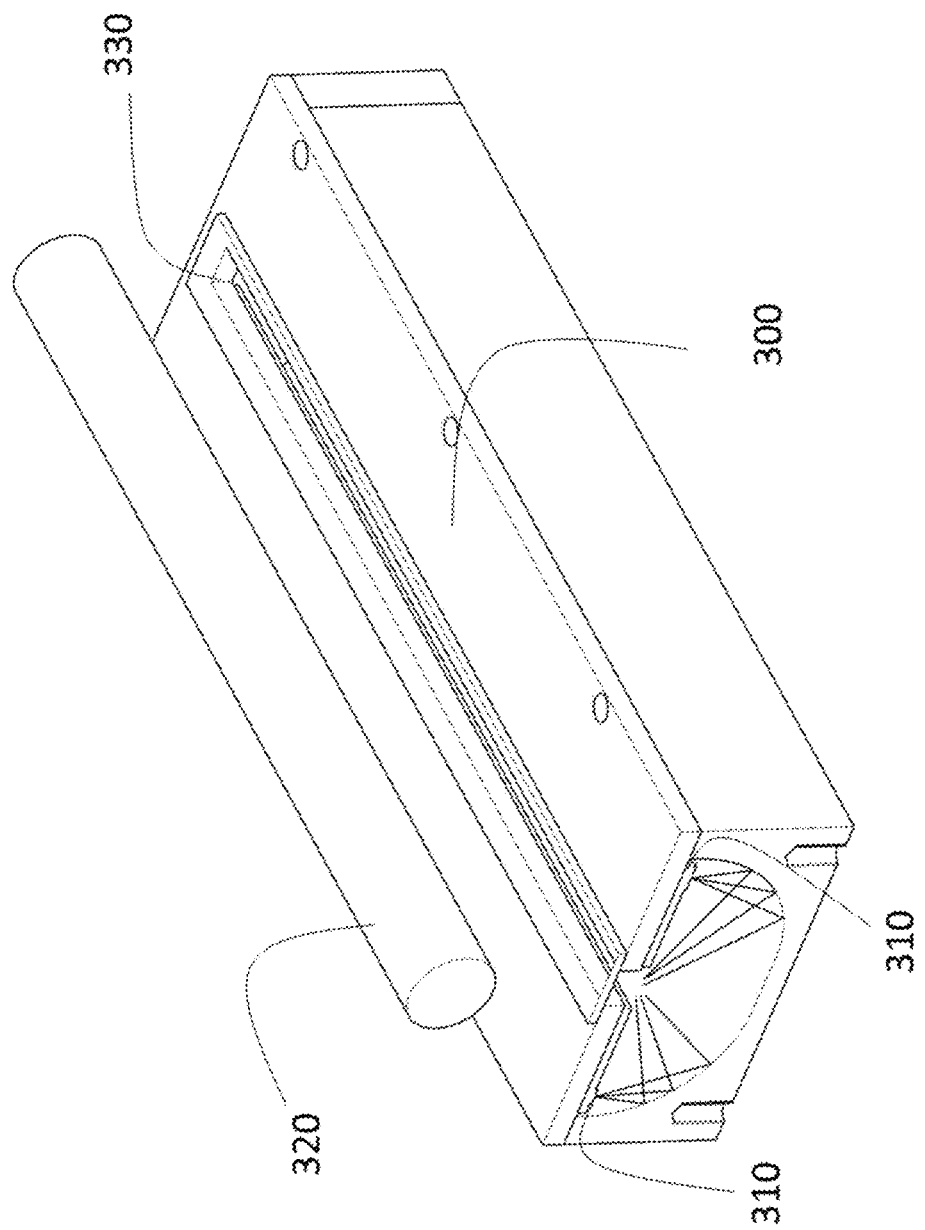
FIG. 3 illustrates one exemplary embodiment of the trans-illumination light source. It is a longish tube-dome type light that mixes uniformly the spectral emissions of light arrays distributed along its entire length selected from group comprising coherent and incoherent light sources.

FIG. 3 illustrates one exemplary embodiment of the trans-illumination light source 70. It is a longish tube-dome type light source disposed vertically over the X-axis trolley and moves in parallel with the Y-translator. It is used for trans-illuminating the examined object, which dictates its longitudinal axis to be intersected by the longitudinal central axis of said imaging optics means. One example of tube light sources are the Xenon lamps used to pump laser emission. These light sources have broad band emission, covering the UV, the visible and the NIR spectral bands.

In another exemplary embodiment the transillumination member of said LSM (trans-LSM) is a tube dome 300 encapsulating LED arrays (stripes) 310, with different spectral emission and all together covering the spectral band from UV to NIR. For example, this can be achieved with seven types of LEDs with the following central wavelengths: 325 nm, 340 nm, 365 nm 385 nm, 405 nm, 470 nm and broad band visible and NIR LEDs. The tube dome may be coated with a diffusive reflector like the coatings used in integrating spheres ($Ba_2SO_4$) with unity reflectance across the UV-NIR spectrum. The light reaches the TS after multiple reflections on the tube's wall, thus becoming homogenized spectrally and spatially.

In all possible embodiments, the longish transillumination light source may be focused by utilizing a longish condenser 320 (e.g. a rod condenser) that focuses the light in the form of a line, covering the entire Y-direction travel of said MIH. In an exemplary embodiment, a stripe-shaped polarizer 330 may be removably or permanently interposed over the entire length of the longish light source, to be used in specialized polarimetric applications. Additional embodiments comprising light sources that follow the motion of said MIH along the Y-axis are also feasible solutions to implement current disclosure.

Figure 4:
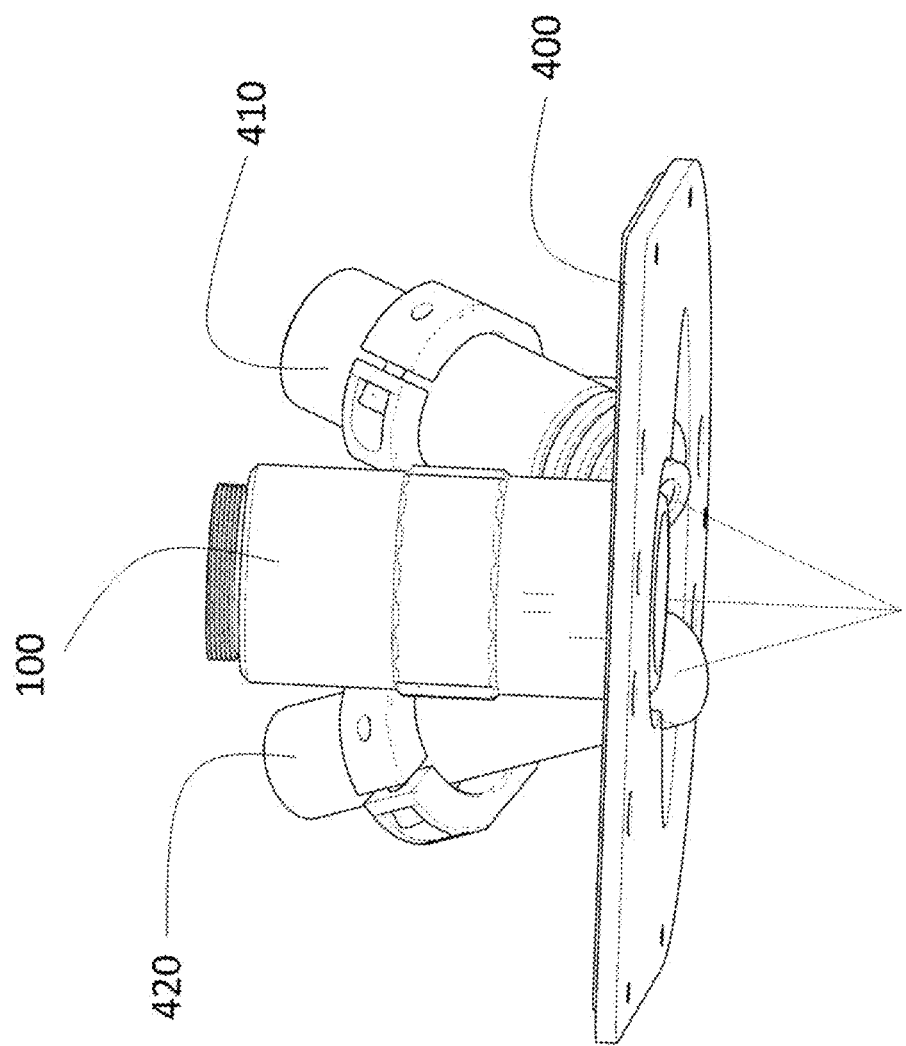
FIG. 4 illustrates an exemplary embodiment of the epi-illumination branch of the light source module, activated for the fluorescence and the reflection imaging modes. It exploits the long working distance of an objective lens that offers sufficient clearance for the light beams to come from oblique directions. An array of coherent and incoherent light sources may be mounted around the objective in a ring arrangement, both being focused at the target object's plan.

FIG. 4 illustrates an exemplary embodiment of the epi-illumination module of said LSM (epi-LSM) 120. According to this embodiment, said imaging optics means is a long working distance objective (e.g. 20-30 mm), leaving sufficient space for the light to come from oblique directions. Oblique illumination has several advantages over co-axial geometries since it filters out surface reflections (glare) and suspend the noise in fluorescence imaging. It also allows for setting up an array of light sources, to be mounted on a ring 400 surrounding said imaging optics means 100.

The ring module may encapsulate white-IR LEDs 410, for the R imaging mode and UV laser lines 420 for the F mode. The LED light sources may be filtered with polarizing optics, for enabling polarimetric imaging in the R mode and for eliminating glare due to surface reflection. Laser lines often offer several distinct advantages over incoherent light sources for fluorescence excitation because: a) the laser beam is highly directional thus simplifying beam focusing; b) have narrow Full Width at Half Max (FWHM) (<3 nm), which extends the useful fluorescence imaging spectral range; and c) it offers sufficient light power thus improving F image Signal-to-Noise-Ratio (SNR), especially in cases with low fluorescence quantum yield. In another exemplary embodiment, an array of narrow-band light sources with emissions spanning the visible and the infrared spectral regions is added in said ring arrangement, to enable a multiple wavelength excitation scheme.

Figure 5:
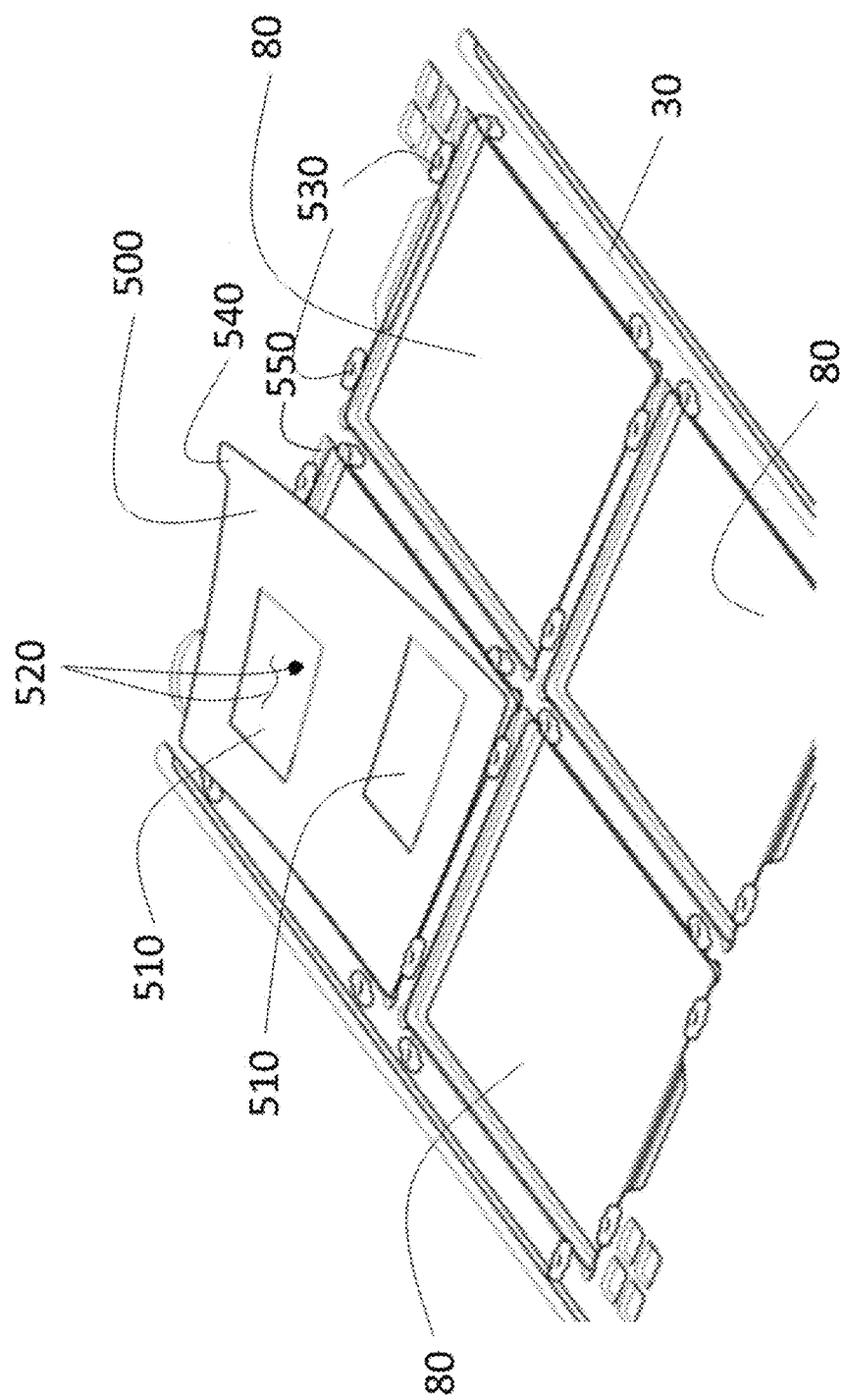
FIG. 5 illustrates a traces sample comprising a Backing Film and a Trace Lifting Tape encapsulating target objects deposited over a transparent glass window of the TMM's supporting structure. The traces sample has a tab ending that it is inserted into a slot engraved over the TMM's supporting structure for locking its orientation. The trace sample can be firmly held at that location with lockers.

FIG. 5 illustrates said TS comprising a backing film (BF) 500 and Trace Lifting Tape (TLT) 510 encapsulating target objects 520 deposited over said TGW 80. The transparent windows 80 can firmly hold said TS with lockers 530. In one exemplary embodiment, said TS has a tab ending 540 that it is inserted into a slot 550 engraved over the second level of said supporting structure 30. This combination acts as a TS orientation key for locking said BF's orientation in relation with the TMM's examination platform. Said tab ending serves also the purpose of adding labelling (e.g. pen writing, barcoding) for ensuring traceability.

In one exemplary embodiment where TSs are collected from a crime field or other fields sensitive to TS contamination, e.g. DNA contamination, both the BF and TLT are placed in self-contained particulate/DNA free packages. Both TLT and BF are polymer films, easily cut, thin, light, non-fluorescent, and non-birefringent. This is essential for avoiding interference when measuring said MID. Typical material fulfilling these specifications and suitable for manufacturing said BF and said TLT are selected from a group comprising PMMA, cyclo-olefin, cast vinyl and polycarbonate material.

Figure 6:
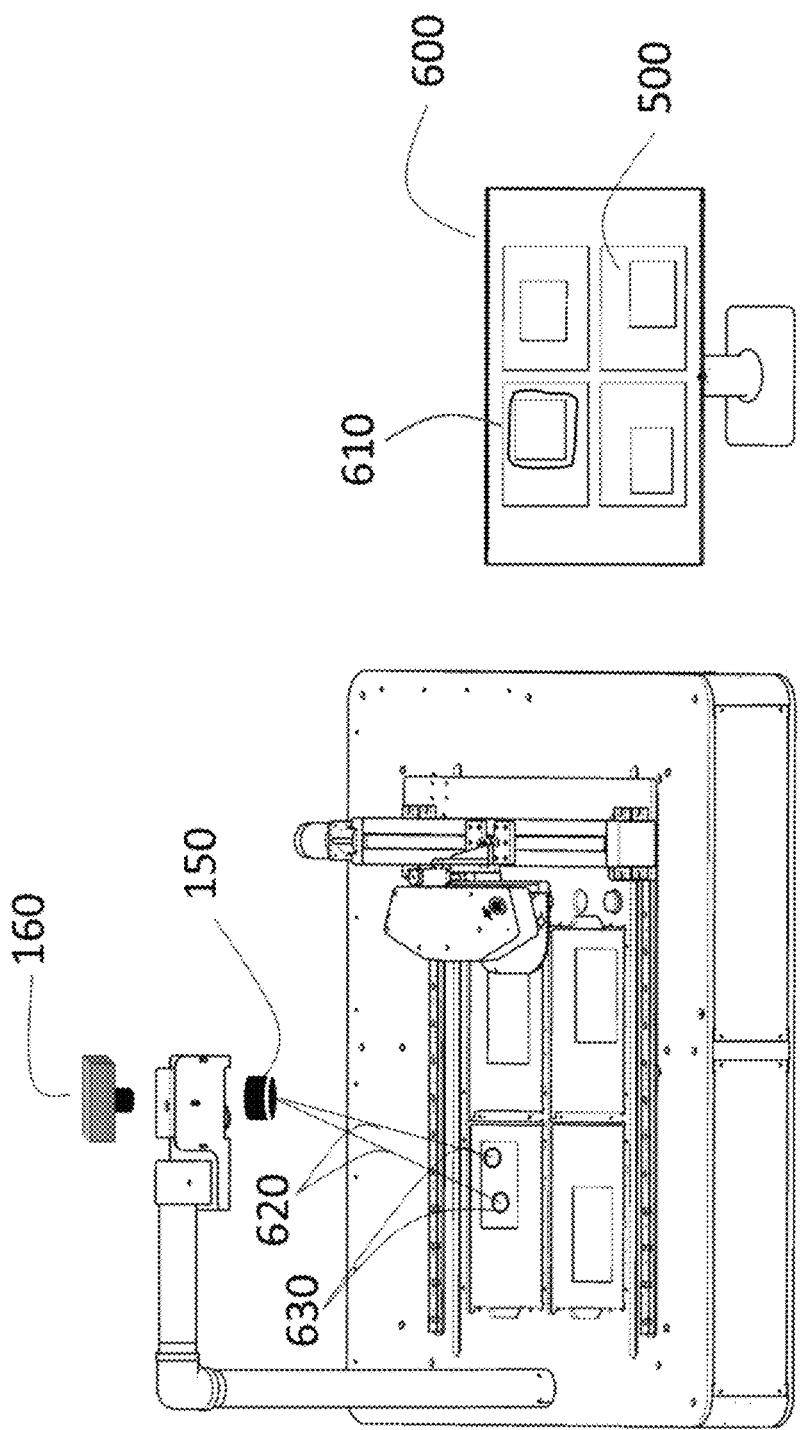
FIG. 6 illustrates one exemplary embodiment of the TMM comprising an overview camera arrangement and a monitor for annotating regions of interest to be examined and a projection system for mapping the compositional characteristics of the target objects located and identified for guiding secondary sampling for subsequent analyses.

FIG. 6 illustrates one exemplary embodiment of a TMS comprising an arrangement for selecting Regions of Interest (ROIs) to limit the examination areas for improving workflow. According to this embodiment, the overview image of said supporting structure is captured by said OVC and it is displayed on a monitor 600, Here, the images of the TS 500 are clearly shown allowing for the clear visualization of the areas occupied with said TLTs. The remaining areas are expected to be void of target objects and can reasonably be excluded from the scanning process. Areas to be excluded or included can be selected either automatically through machine-vision based recognition of said TLTs or with annotations 610 drown over their displayed image, using the mouse or a digital stylus over a touch screen monitor. Through a calibration process that corelates the monitor's pixel areas over the scanning field of the TMM, the selected ROIs are converted to actual XY coordinates to be scanned.

FIG. 6 illustrates also the navigation function of the disclosed TMM. In a relevant exemplary embodiment, the TMM comprises said light projection system (LPS) 150, mounted at a proper distance from said supporting structure and said LPS lens characteristics so that said light marks can reach every point of said structural platform supporting the examined TS. Upon completing the TMM examination, said LPS projects light beams 620 forming patterns with colours and shapes informing about the natural location and the structural and/or chemical characteristics of the target objects located and identified. The disclosed analytical projection mapping, implemented by TMM, offers a navigation tool to the operator who may add hand-writing marks e.g. by circling with a pen around these areas 630. The TS can then be removed away from the TMM and selected areas may be dissected for subsequent destructive and non-destructive analyses such as PCR, gas chromatography, electron microscopy etc.

Figure 7:
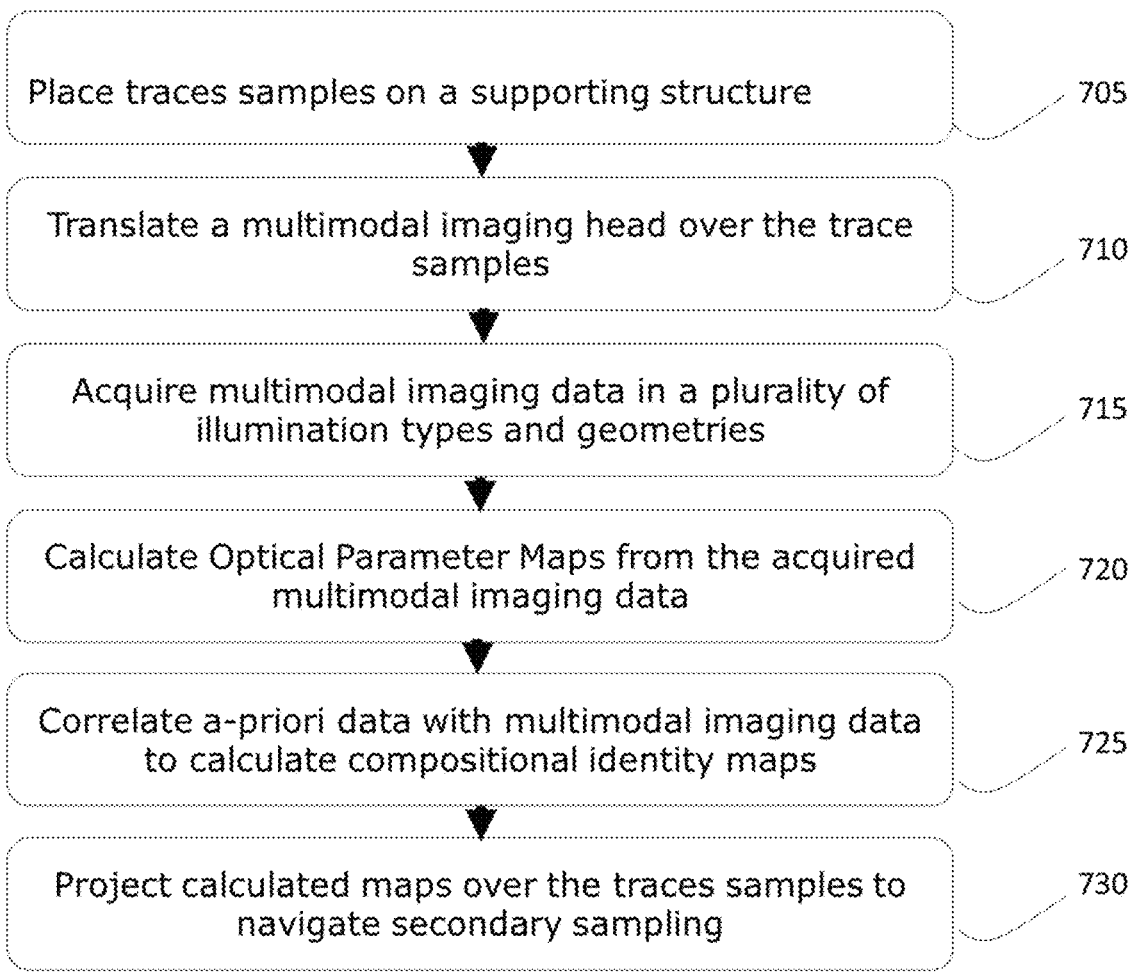
FIG. 7 illustrates the basic steps and the flow chart of a method of practicing the present invention

FIG. 7 illustrates an example flow chart of practicing the present invention. One particular example offering optimum operation from the workflow perspective is given below. In step 705, The TLT-BF members of said TS encapsulating the collected target objects are placed over said supporting structure. The operator may enter names and descriptions for said TS either manually or through an OCR/barcode reader to the corresponding folder of said TMM's CPU. Next, the OVC is switched on and the overview image of the entire supporting structure containing said TSs is displayed on a monitor. Through a specialized menu the operator may select only those subareas that contain said TLT's to be scanned. The menu offers the option of automatically selecting TS subareas by integrating tools met in machine vision applications. Upon selecting the subareas of interest, an automated fast scanning may be initiated. In step 710, a multimodal imaging head is translated over the trace samples. The fast scanning involves the scanning of the selected subareas with snapshot imaging modes, namely the color, multispectral and polarization imaging modes in all transmission, reflectance and fluorescence illumination modes. In step 715, multimodal imaging data in a plurality of illumination types and geometries is acquired. The fast scanning process is implemented with said MIH and said LSM scanning either the selected ROIs or the whole TS area. Scanning is performed on a frame-by-frame basis and with the Z translator operating as an autofocusing scanner. All images are stored and analyzed in parallel with the scanning. A fraction of the scanned target objects may comprise difficult cases to identify with said MID data collected with the fast scanning mode. These target objects comprise a temporary "unknown" category that need to be analyzed with the hyperspectral mode, for the purpose of increasing the dimensionality of said MID-space. The XY translator controller returns only to those areas containing unknown target objects and performs hyperspectral analysis in transmission, reflection, fluorescence and polarization modes. The collected additional data are further analyzed, towards minimizing the number of the unknown samples. The spectra collected from spectroscopic imaging modalities are combined with polarization and morphological parameters to make up said MID-space. In step 720, Optical Parameter Maps are calculated from the acquired MID. In step 725, a-priori data is correlated with the MID to calculate compositional identity maps. Finally, in step 730, the calculated maps are projected over the traces samples to navigate secondary sampling.

Figure 8:
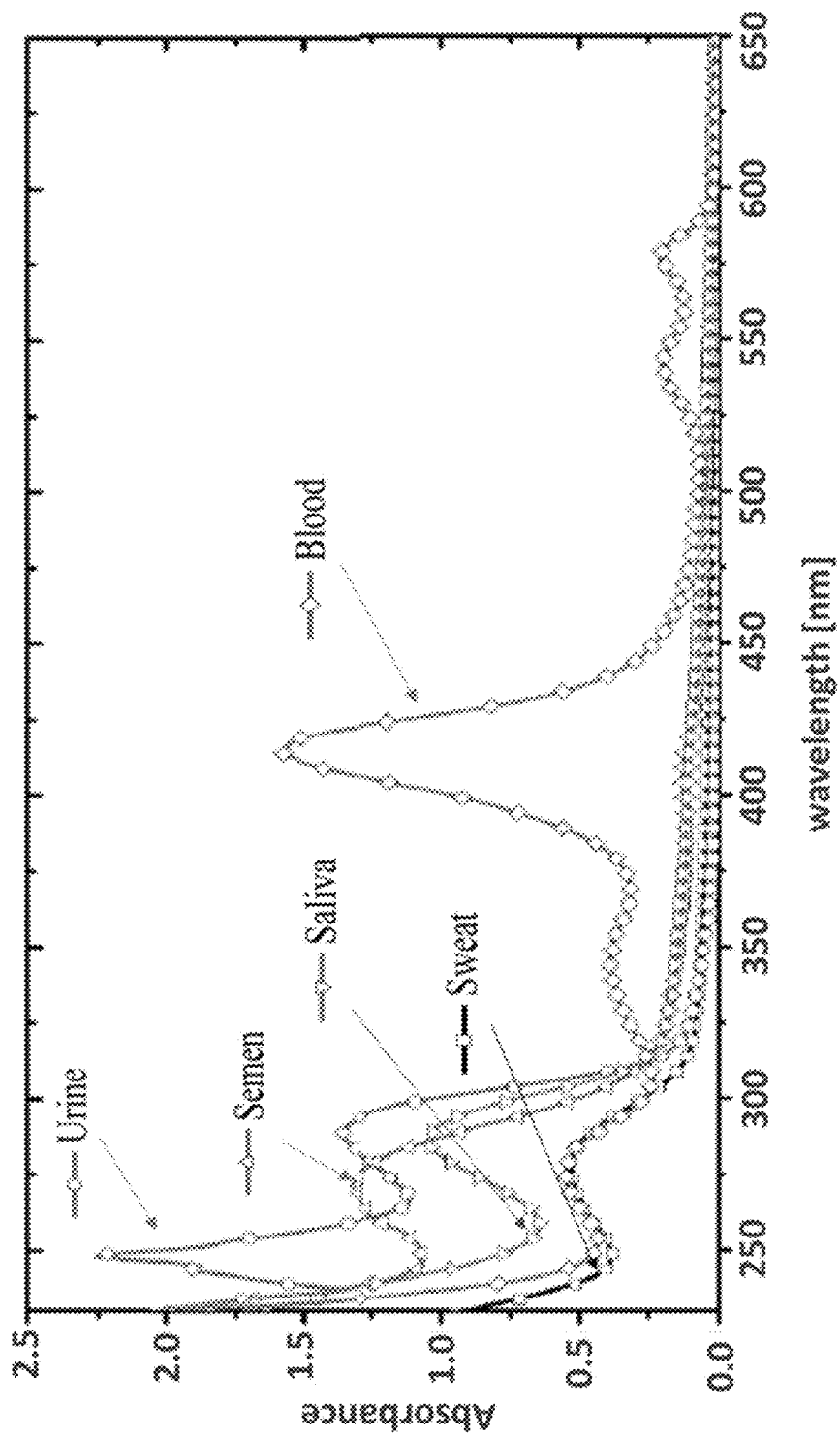
FIG. 8 illustrates the absorbance vs. wavelength curves of a variety of bodily fluids showing characteristic features that are exploited for their detection and identification.

FIG. 8 illustrates an absorbance vs. wavelength graph calculated from said T mode. The graph shows bodily fluids of forensics interest. As it can be seen, they display characteristic spectral features, comprising spectral signatures facilitating their identifications with said TMM operating in the T mode.

Figure 9:
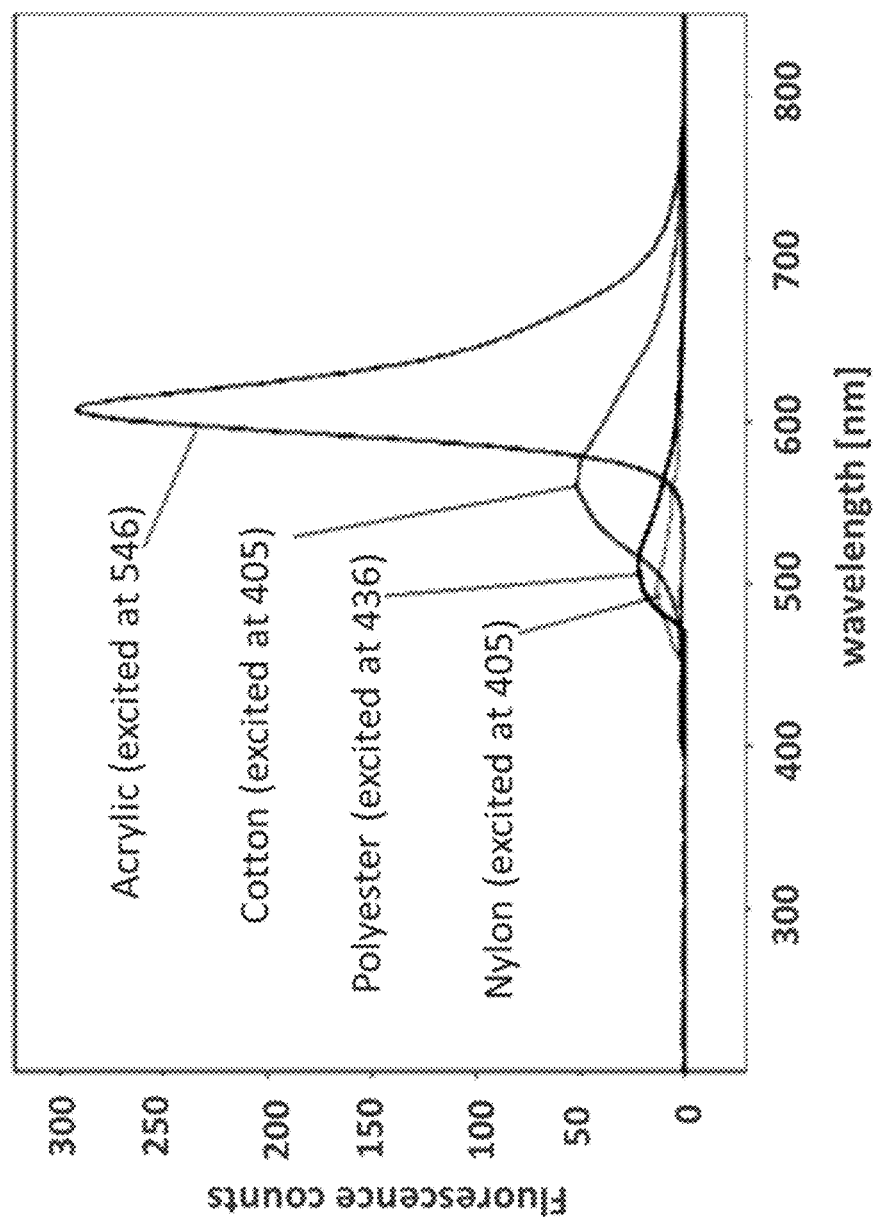
FIG. 9 illustrates the fluorescence intensity (in counts) vs. wavelength curves of a variety of fibers of forensics interest offering spectral signatures facilitating their detection and identification.

FIG. 9 illustrates another example of target objects of forensics interest, namely the fluorescence intensity (in counts) vs. wavelength of a number of fibers, often found in crime fields. Their fluorescence emission pattern is characteristics to their identity, thus offering a means for their identification with said TMM operating in the F mode.

The present disclosure incorporates efficient software means and algorithms for handling said MID-space, generated in millions of pixels and for thousands of scanning fields. Efficient unsupervised algorithms are employed for calculating said OPM and machine learning and other Artificial Intelligence (AI) methods are utilized from calculating said CSIM. Spectral data are represented in the form of vectors in a multidimensional spectral space and spectral differences are measured as the angle between these vectors. Unsupervised algorithms are employed for classifying spectra on the basis of similarity criteria. This analysis returns a number of spectral classes and their corresponding centroid spectra, representative to the spectral content of their class. Classifications algorithms are selected from a group comprising at least the algorithms: K-means Clustering, K-Medoids Clustering, Gaussian Mixture Model Clustering (GMM), Density-Based Spatial Clustering of Application with Noise, Spectral Clustering, Interactive Self-Organizing Data Analysis Technique (ISODATA), Self-Organizing Map (SOM), Agglomerative Hierarchical Clustering Spectral Angle Mapper (SAM). These are executed in conjunction with data similarity assessment algorithms, which are selected from a group comprising at least Spectral Angle Mapper (SAM), Spectral Information Divergence (SID), Cosine Distance, MinKowski Distance, SqEuclidian Distance.

The last phase of the target object identification process involves the comparison of said centroid spectra with golden standard spectra, obtained from materials with known chemical and structural composition. This comparison establishes a labelling process, leading to the calculation of said CSIM, displaying compositional/structural/morphological IDs in the form of pseudo-colours. The thematic maps as the final result of the classification task may be visualized side-by-side with colour, spectral or fluorescence images all corresponding to the same FOV.

Upon completing the identification process, the MIH moves to its rest position, not obstructing the TS area. Next, the LPS switches on, projecting light marks over the TS surface. Light markings may include different shapes and colors, each one corresponding to different types of target objects identified, including also traces failed to be identified. Finally, the projected marks are used for navigating manual marking or cutting/removing TLT's areas eligible for secondary destructive and nondestructive analyses.

The present disclosure refers to an analytical method and device measuring critical parameters. To ensure high reproducibility and accuracy, the TMM system implements two main auto calibration procedures that are automatically executed at predetermined time intervals: a) calibration for compensating possible drifts in recorded image pixel values and spectral content. This is achieved will the aid of calibration targets with known reflectance and fluorescence spectrum. Light source intensity variations due to electronic drifts and/or ageing are compensated by the automatic adjustment of the camera's shutter/gain levels; b) positioning calibration, which is performed with the aid of micron size markings graved onto a scale disposed over TMM's structural platform. The integrated auto calibration processes can run even in parallel with routine analyses, provided that the areas of interest to be scanned include the corresponding reference samples. This obviously allows for prolonged operation without the need for manual adjustments.

It is noted, that the components (hardware, software) of the system according to the present invention shown in Figs are by means of example and other components may be present but not shown in these Figs, or some of the displayed components may be omitted. Other hardware and software may be possibly selected among known architectures.

The software may be implemented in any computing language, or in an abstract language (e.g. a metadata-based description which is then interpreted by a software or hardware component). The software running in the above-mentioned hardware, effectively transforms a general-purpose or special-purpose hardware, or computing device, or system into one that specifically implements the present innovative solution.

The above exemplary embodiments are intended for use either as a standalone solution or as part of other methods, processes and systems.

The above exemplary embodiment descriptions are simplified and do not include hardware and software elements that are used in the embodiments but are not part of the current solution, are not needed for the understanding of the embodiments, and are obvious to any user of ordinary skill in related art. Furthermore, variations of the described method, system architecture, and software architecture are possible, where, for instance, method steps, and hardware and software elements may be rearranged, omitted, or new added.

Various embodiments of the invention are described above in the Detailed Description. While these descriptions directly describe the above embodiments, it is understood that those skilled in the art may conceive modifications and/or variations to the specific embodiments shown and described herein. Any such modifications or variations that fall within the purview of this description are intended to be included therein as well. Unless specifically noted, it is the intention of the inventor that the words and phrases in the specification and claims be given the ordinary and accustomed meanings to those of ordinary skill in the applicable art(s).

In one or more exemplary embodiments, the functions described may be implemented in hardware, software, firmware, or any combination thereof. If implemented in software, the functions may be stored on or transmitted over as one or more instructions or code on a computer readable medium. Computer-readable media includes both computer storage media and communication media including any medium that facilitates transfer of a computer program from one place to another. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer or any other device or apparatus operating as a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blue ray disc where disks usually reproduce data magnetically, while discs reproduce data optically with lasers. Combinations of the above should also be included within the scope of computer-readable media.

The foregoing description of a preferred embodiment and best mode of the invention known to the applicant at this time of filing the application has been presented and is intended for the purposes of illustration and description. It is not intended to be exhaustive or limit the invention to the precise form disclosed and many modifications and variations are possible in the light of the above teachings. The embodiment was chosen and described in order to best explain the principles of the invention and its practical application and to enable others skilled in the art to best utilize the invention in various embodiments and with various modifications as are suited to the particular use contemplated. Therefore, it is intended that the invention not be limited to the particular embodiments disclosed for carrying out this invention, but that the invention will include all embodiments falling within the scope of the appended claims.

The invention claimed is:
1. A Trace Microanalysis Microscope (TMM) comprising:
   a stationary supporting structure having a surface capable of holding a plurality of trace samples (TSs),
   an electronically driven spatial translation platform, coupled to the stationary supporting structure, said platform holding a mechanical mount movable over any point of said surface,
   a Multimodal Imaging Head (MIH) coupled to and disposed over said mount, said MIH comprising imaging optics means and configd to acquire Multimodal Imaging Data (MID), said MID comprising at least color and multispectral imaging data obtained from target objects contained in said TSs and in a Filed-of-View (FoV) of said imaging optics means, a Light Source Module (LSM), coupled to said platform and comprising at least one broad band light source for illuminating at least a portion of a TS in transmission geometry, a Computer Processing Unit (CPU) executing first program instructions for identifying a location and optical parameter values of the target objects, a Light Projection System (LPS), mounted on a pole disposed over said supporting structure and configd to project light patterns over the surface of said TSs said light patterns characterizing the location of said target objects and their optical parameter values said CPU executing second program instructions for calculating Optical Parameter Maps (OPM) from said MID, wherein said OPM corresponding to the light patterns of the Light Projection System (LPS).

2. The TMM of claim 1, wherein said MIH comprises one color and one black and white imaging sensor to form an imaging sensor arrangement, said sensors acquiring simultaneously the same FoV, and translator means moved by an actuator onto which a beam divider and an electronically driven tunable filter are disposed and selectively interposed in an imaging ray path of said imaging sensor arrangement, so that said MIH is operable in color, snapshot multispectral and hyperspectral imaging modes.

3. The TMM of claim 2 wherein said imaging sensor arrangement further comprises a polarization sensor so that said MIH is operable in color, snapshot multispectral, hyperspectral and polarization imaging modes and in combinations thereof.

4. The TMM of claim 1 wherein said LSM further comprises an epi-illumination unit with light sources selected from a group comprising broad-band light sources, narrowband light sources, LED and Laser light sources.

5. The TMM of claim 1 wherein said LSM further comprises light sources filtered with polarizing filter means.

6. The TMM of claim 1, wherein the CPU further executing third program instructions to convert said OPM into a Chemical and Structural Identity Map (CSIM) through a correlation of values of said MID and OPM with values obtained from reference objects with known chemical and structural composition.

7. The TMM of claim 1, wherein said OPM comprise optical parameters selected from a group comprising intensity values, peak intensity values, ratio values calculated from raw or centroid spectra, spectral similarity values, stokes parameters and birefringence values.

8. The TMM of claim 1, further comprising an Overview Camera (OVC) disposed over said pole to capture an image of the entire TS area, said image to be displayed on a screen for digitally annotating TS areas, with said annotations being converted, through a user interface program executed by said CPU, to instructions addressed to a control unit to drive said spatial translators so that said MIH selectively scans the annotated areas.

9. The TMM of claim 1, wherein said TSs comprise biological tissue samples.

10. The TMM of claim 1, wherein said TSs comprise bodily fluid samples.

11. The TMM of claim 1 wherein said target objects comprise traces found in a crime field and said TSs comprise a Backing Film (BF) and a Trace Lifting Tape (TLT) encapsulating said traces.

12. The TMM of claim 11, wherein each TS comprises a tab ending insertable into a slot engraved over said supporting structure surface for locking said TS orientation in relation with the TMM's platform.

13. The TMM of claim 11, wherein said BF and said TLT are made of material optically clear, non-polarizing, non-fluorescing and non-birefringent at least in the spectral range 300-700 nm.

14. The TMM of claim 11, wherein said BF and said TLT are manufactured from materials selected from a group comprising: Polymethyl methacrylate (PMMA), cyclo-olefin, cast vinyl and polycarbonate material.

15. A method to perform trace microanalysis comprising:
placing a plurality of trace samples (TSs) on a surface of a stationary supporting structure, translating a mechanical mount over any point of said surface, said mount disposing a Multimodal Imaging Head comprising imaging optics means, acquiring Multimodal Imaging Data (MID), said MID comprising at least color and multispectral imaging data obtained from target objects contained in said TSs and in a Filed-of-View (FoV) of said imaging optics means, illuminating at least a portion of a TS in transmission geometry with a Light Source Module (LSM) coupled to said platform said LSM comprising at least one broad band light source, executing first program instructions in a Computer Processing Unit (CPU) for identifying a location and optical parameter values of the target objects, projecting light patterns over the surface of said TSs by a Light Projection System (LPS), said LPS mounted on a pole disposed over said supporting structure said light patterns characterizing the location of said target objects and their optical parameter values executing second program instructions by said CPU for calculating Optical Parameter Maps (OPM) from said MID, wherein said OPM corresponding to the light patterns of the Light Projection System (LPS).

* * * * *